United States Patent
Huang-Fu et al.

(10) Patent No.: US 10,178,585 B2
(45) Date of Patent: Jan. 8, 2019

(54) ENHANCED MULTIMEDIA CALL CONTROL IN NEXT GENERATION MOBILE COMMUNICATION SYSTEMS

(71) Applicant: MEDIATEK INC., Hsinchu (TW)

(72) Inventors: Chien-Chun Huang-Fu, Hsinchu (TW); Guillaume Sebire, Oulu (FI); Yu-Syuan Jheng, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/808,593

(22) Filed: Nov. 9, 2017

(65) Prior Publication Data

US 2018/0132141 A1 May 10, 2018

Related U.S. Application Data

(60) Provisional application No. 62/419,953, filed on Nov. 9, 2016.

(51) Int. Cl.
*H04W 36/00* (2009.01)
*H04L 29/06* (2006.01)
(Continued)

(52) U.S. Cl.
CPC ..... *H04W 36/0022* (2013.01); *H04L 65/1016* (2013.01); *H04W 36/04* (2013.01);
(Continued)

(58) Field of Classification Search
CPC .............................. H04W 36/04; H04W 36/36
See application file for complete search history.

(56) References Cited

U.S. PATENT DOCUMENTS 9,706,448 B2 * 7/2017 Naik ................. H04W 36/0022
2015/0358477 A1 12/2015 Jeong et al. .................. 370/259
(Continued)

FOREIGN PATENT DOCUMENTS

CN 104956702 A 7/2013
CN 105706471 A 11/2013
(Continued)

OTHER PUBLICATIONS

International Search Report and Written Opinion of International Search Authority for PCT/CN2017/110075 dated Feb. 1, 2018 (11 pages).

*Primary Examiner* — Diane Mizrahi
(74) *Attorney, Agent, or Firm* — Imperium Patent Works; Zheng Jin

(57) ABSTRACT

A network-based solution of supporting IP multimedia subsystem (IMS) call setup in a next generation system (5GS) is proposed. During an attach or registration area update procedure, a serving base station sends an indication to a UE indicating whether IMS voice over PS session is supported or not. Upon receipt of the indication that IMS VoPS is supported, the UE triggers an IMS registration procedure. However, when an MO/MT call happens, the network determines that the UE may be in conditions where voice service is not supported because the network is not able to provide a successful IMS VoPS over the current serving cell connected to 5G core network. The network then triggers a RAT change or a EPS fallback procedure such that the UE is handover to a target cell that supports IMS VoPS.

20 Claims, 5 Drawing Sheets

(51) Int. Cl.
  *H04W 36/04*  (2009.01)
  *H04W 36/14*  (2009.01)
  *H04W 36/30*  (2009.01)
  *H04W 88/08*  (2009.01)

(52) U.S. Cl.
  CPC .......... *H04W 36/14* (2013.01); *H04W 36/30* (2013.01); *H04L 65/1063* (2013.01); *H04W 88/08* (2013.01)

(56) References Cited

U.S. PATENT DOCUMENTS

| | | | |
|---|---|---|---|
| 2016/0127889 A1* | 5/2016 | Cui ...................... | H04W 36/08 370/328 |
| 2016/0278132 A1 | 9/2016 | Baek et al. ............... | 455/404.1 |
| 2017/0257784 A1 | 9/2017 | Ni et al. | |
| 2018/0081927 A1* | 3/2018 | Soryal ............... | G06F 17/30371 |

FOREIGN PATENT DOCUMENTS

| | | |
|---|---|---|
| CN | 105814934 A | 11/2014 |
| WO | WO2016045728 A1 | 9/2014 |

\* cited by examiner

ENHANCED MULTIMEDIA CALL CONTROL IN NEXT GENERATION MOBILE COMMUNICATION SYSTEMS

CROSS REFERENCE TO RELATED APPLICATIONS

This application claims priority under 35 U.S.C. § 119 from U.S. Provisional Application No. 62/419,953, entitled "Enhanced Multimedia Call Control", filed on Nov. 9, 2016, the subject matter of which is incorporated herein by reference.

TECHNICAL FIELD

The disclosed embodiments relate generally to wireless communication, and, more particularly, to method of supporting multimedia services in next generation mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards.

As set forth in the 3GPP, IP Multimedia Subsystem (IMS) is a core network that provides IP multimedia services to user equipments (UEs) over an Internet Protocol (IP) network. Historically, mobile phones have provided voice call services over a circuit-switched (CS) network, rather than strictly over an IP packet-switched (PS) network. Alternative methods of delivering voice or other multimedia services over IP have become available on smartphones (e.g. VoIP or Skype), but they have not become standardized across the industry. IMS is an architectural framework to provide such standardization. IMS is able to communicate with UEs through different types of access network, such as a wireless local area network (WLAN), an Ethernet network, a packet data network (PDN), or another type of access network. IMS is a new way to dial PS call on LTE (Voice over IP or Voice over LTE) instead of fallback to 2G/3G legacy CS call.

The Next Generation. Mobile Network (NGMN) board, has decided to focus the future NGMN activities on defining the end-to-end requirements for 5G. Voice service will be an important feature for the next generation system, e.g., NG system (NGS) or 5G system (5GS). It is proposed that the NG/5G systems shall support IMS PS voice service, IMS PS voice service continuity with the 4G evolved packet system (EPS) and INS PS voice service fallback to EPS. However, when a voice call triggered, a UE may be in conditions where voice service is not supported. In this case, the UE shall move to a proper access or core system to continue the voice call setup.

Solutions for IMS call setup in NGS/5GS when the serving cell in NGS/5GS is unable to support multimedia calls are sought.

SUMMARY

A network-based solution of supporting IP multimedia subsystem (IMS) call setup in a next generation system (5GS) is proposed. During an attach or registration area update procedure, a serving base station sends an indication to a UE indicating whether IMS voice over PS session is supported or not. Upon receipt of the indication that IMS VoPS is supported, the UE triggers an IMS registration procedure. However, when a mobile originated or mobile terminated (MO/MT) call happens, the network determines that the UE may be in conditions where voice service is not supported because the network is not able to provide a successful IMS VoPS over the current serving cell connected to 5G core network. The network then triggers a RAT change or a EPS fallback procedure such that the UE is handover to a target cell that supports IMS VoPS.

In one embodiment, a base station transmits information related to IP Multimedia Subsystem (IMS) to a user equipment (UE) in a Next Generation (NG) serving cell connected to a 5G core network. The information indicates IMS voice over PS session is supported over a 5G system (5GS). The base station receives an IMS call indication from an IMS server via the 5GC. The base station determines whether IMS voice over PS session is supported over the NG serving cell with a predefined QoS requirement. The base station sends a handover command to the UE if the current NG serving cell does not support IMS VoPS. The UE is handover from the current NG serving cell to a target cell that supports IMS VoPS.

In another embodiment, a UE receives an indication indicates that IP multimedia subsystem (IMS) voice over PS session is supported in a 5GS. The UE performs IMS registration with an IMS server, and subsequently the UE is originating or terminating an IMS voice call. The UE receives a handover command when IMS voice over PS session is not supported over the NG service cell with a predefined Quality of Service (QoS) requirement, and the UE handover from the NG serving cell to a target cell that supports IMS VoPS. The UE performs IMS voice call setup through the IMS server in the target cell.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
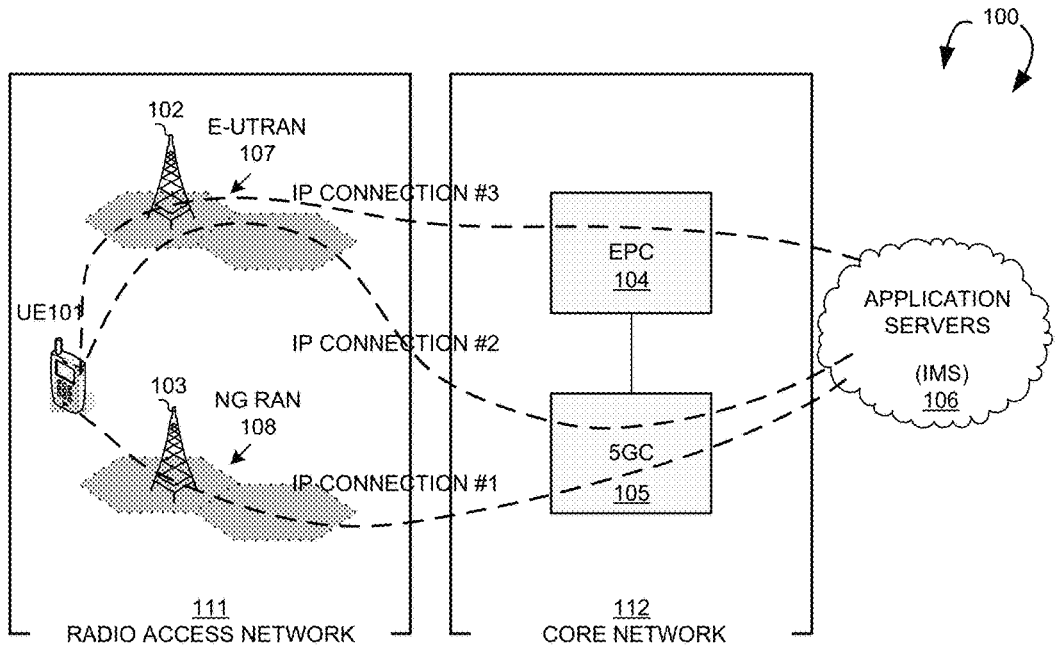
FIG. 1 illustrates an exemplary next generation system with multiple access and core networks and a user equipment (UE) supporting IP multimedia subsystem (IMS) call setup in accordance with one novel aspect.

FIG. 1 illustrates an exemplary next generation system 100 with multiple radio access and core networks and a user equipment (UE) supporting IP multimedia subsystem (IMS) call setup in accordance with one novel aspect. Next generation mobile communication system 100 comprises radio access networks 111, core networks 112, and application servers including an IP multimedia subsystem (IMS) server 106. Radio access networks RAN 111 provide radio access for UE 101 via various radio access technologies (RATs). For example, RAN 111 may include an E-UTRAN 107 having a base station 102 and an NG RAN (NR) 108 having a base station 103. Core networks CN 112 provide services for UE 101 via an LTE/4G evolved packet core (EPC) 104 or via a next generation 5G core network (5GC) 105. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

IP Multimedia Subsystem (IMS) is a core network that provides IP multimedia services to user equipments (UEs) over an Internet Protocol (IP) network. The Next Generation Mobile Network (NGMN) board, has decided to focus the future NGMN activities on defining the end-to-end requirements for 5G. Voice service will be an important feature for the next generation system, e.g., NG system (NGS) or 5G system (5GS). It is proposed that the NG/5G systems shall support IMS PS voice service, IMS PS voice service continuity with the 4G evolved packet system (EPS), and IMS PS voice service fallback to EPS. However, when a voice call is triggered, a UE may be in conditions where voice service is not supported. In this case, the UE shall move to a proper access or core network to continue the voice call setup.

In accordance with one novel aspect, a network-based solution for supporting IMS call setup in a next generation NG/5G system is proposed. In the example of FIG. 1, UE 101 is initially served by base station 103 in an NG RAN 108 connected to 5GC 105. During an attach or registration area update procedure, the serving base station 103 will send an indication toward UE 101—informing UE 101 whether IMS voice over PS session is supported or not supported. A UE with "IMS voice over PS" voice capability will take this indication into account when performing voice domain selection. Upon receipt of the indication that IMS VoPS is supported, UE 101 triggers the IMS registration procedure if it is IMS unregistered. In FIG. 1, UE 101 is already IMS registered and establishes an IP connection #1 via NG RAN 108 and 5GC 105 to be connected to application servers. UE 101, however, may be in conditions where voice service is not supported even though UE 101 is already IMS registered, because the network is not able to provide a successful IMS service over PS session over NG RAN 108 connected to 5GC 105. In a first embodiment, E-UTRAN 107 connected to 5GC 105 supports voice, and NG RAN 108 is able to trigger handover UE 101 to E-UTRAN 107 connected to 5GC 105 and establish IP connection #2 for voice service. In a second embodiment, UE 101 supports handover to EPS and EPS supports voice, and NG RAN 108 is able to trigger handover UE 101 to E-UTRAN 107 connected to EPC 104 and establish IP connection #3 for voice service.

Figure 2:
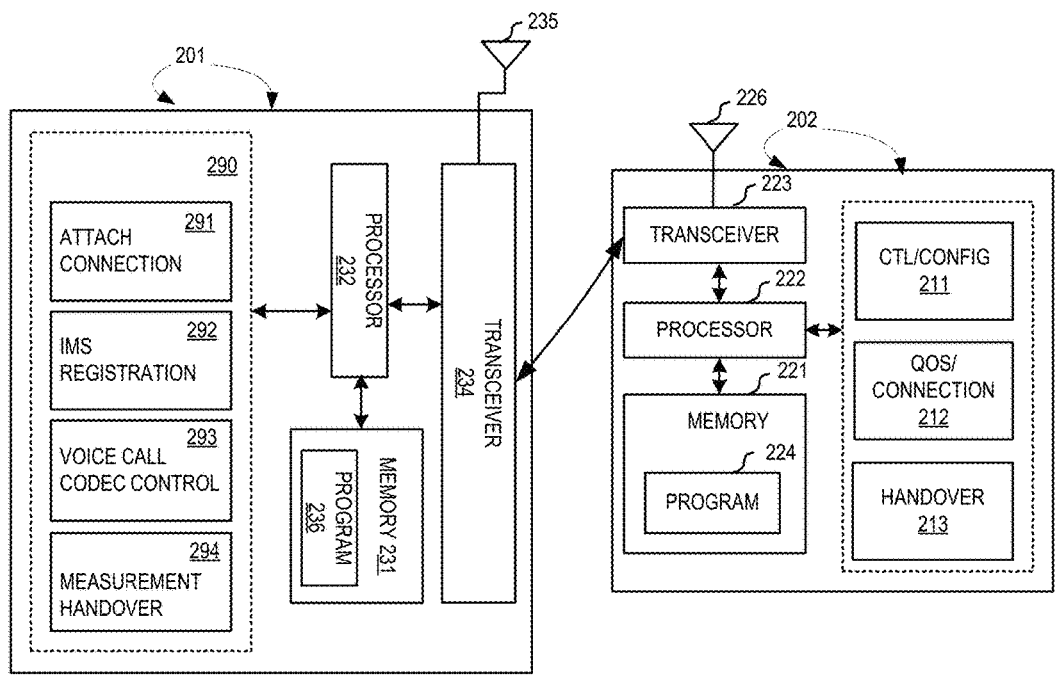
FIG. 2 illustrates simplified block diagrams of a user equipment (UE) and a base station (BS) in accordance with embodiments of the current invention.

FIG. 2 illustrates simplified block diagrams of a user equipment UE 201 and a base station BS 202 in accordance with embodiments of the current invention. BS 202 may have an antenna 226, which may transmit and receive radio signals. RF transceiver module 223, coupled with the antenna, may receive RF signals from antenna 226, convert them to baseband signals and send them to processor 222. RF transceiver 223 may also convert received baseband signals from processor 222, convert them to RF signals, and send out to antenna 226. Processor 222 may process the received baseband signals and invoke different functional modules to perform features in BS/AP 202. Memory 221 may store program instructions and data 224 to control the operations of BS 202. BS 202 may also include a set of functional modules and control circuits, such as a control and configuration circuit 211 for control and configure IMS related features including providing two indicators—"IMS VoPS Supported" and "RAT VoPS Supported"- to UE, a QoS and connection circuit 212 for establish radio connection with UE that satisfies predefined Quality of Service (QoS) flow requirement, and a handover circuit 213 for sending handover commands to UE.

Similarly, UE 201 has an antenna 235, which may transmit and receive radio signals. RF transceiver module 234, coupled with the antenna, may receive RF signals from antenna 235, convert them to baseband signals and send them to processor 232. RF transceiver 234 may also convert received baseband signals from processor 232, convert them to RF signals, and send out to antenna 235. Processor 232 may process the received baseband signals and invoke different functional modules to perform features in the UE 201. Memory 231 may store program instructions and data 236 to control the operations of the UE 201. UE 201 may also include a set of function modules and control circuits that may carry out functional tasks of the present invention. An attach and connection circuit 291 may attach to the network and establish connection with serving base station, an IMS registration circuit 292 may perform IMS registration with IMS server, a voice call and codec control circuit 293 may originate or terminate voice calls and negotiate codec parameters, and a measurement and handover circuit 294 may perform measurements and handle handover functions in the network.

The various function modules and control circuits may be implemented and configured by software, firmware, hardware, and combination thereof. The function modules and circuits, when executed by the processors via program instructions contained in the memory, interwork with each other to allow the base station and UE to perform embodiments and functional tasks and features in the network. In one example, each module or circuit comprises a processor (e.g., 222 or 232) together with corresponding program instructions.

Figure 3:
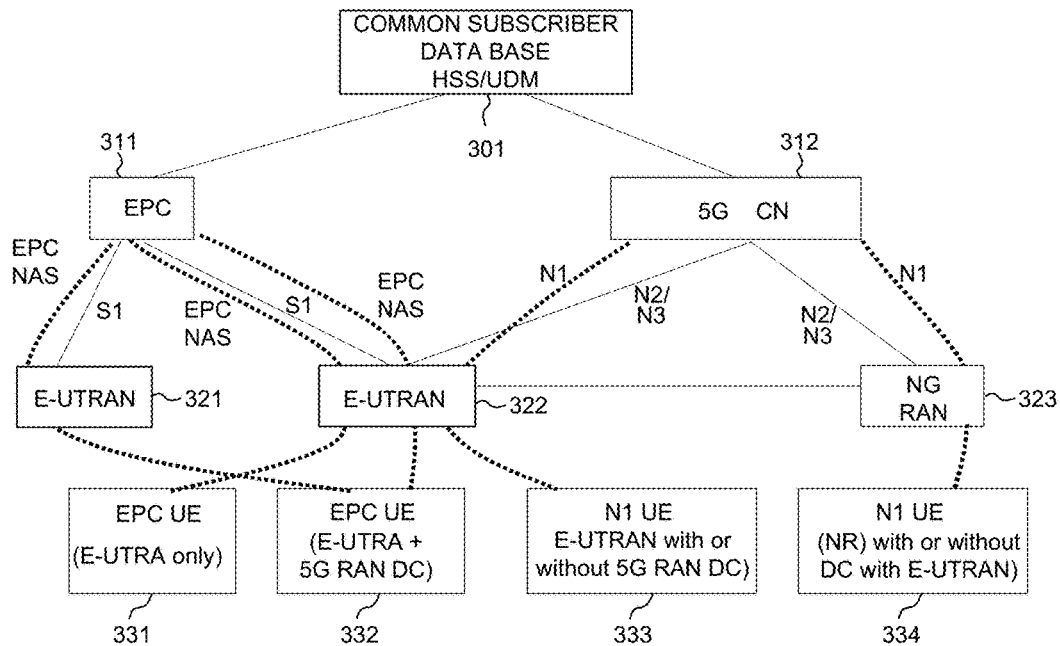
FIG. 3 illustrates interworking and migration for IMS call setup support in 5GS in accordance with embodiments of the current invention.

FIG. 3 illustrates interworking and migration for IMS call setup support in 5GS in accordance with embodiments of the current invention. Deployment based on different 3GPP architectures (i.e. EPC based or 5GC based) and UEs with different capabilities (EPC NAS and 5GC NAS) may coexist at the same time within one PLMN. UE will use EPC NAS or 5GC NAS procedures depending on the core network by which it is served. In order to interwork with EPC, UE that supports both 5GC and EPC NAS can operate in single-registration mode or dual-registration mode. PDN sessions can be transferred from 5GC to EPC or from EPC to 5GC for UEs in single-registration or dual-registration mode for mobility. In one example, UEs with dual-registration mode may be used for IMS voice.

In the example of FIG. 3, In order to support smooth migration, it is assumed that the EPC 311 and the 5GC 312 have access to a common subscriber database 301, that is HSS in case of EPC and UDM in case of 5GC, acting as the master database for a given UE. E-UTRAN 321 connects to EPC 311 via S1 interface; E-UTRAN 322 connects to EPC 311 via S1 interface, and connects to 5GC 312 via N2/N3 interface; NG RAN 323 connects to 5GC 312 via N2/N3 interface. E-UTRAN 322 and NG RAN 323 are interconnected. From UE perspective, EPC UE 331 supports E-UTRA only; EPC UE 332 supports E-UTRA+5G RAN dual connectivity; N1 UE 333 supports E-UTRAN with or without 5G RAN dual connectivity; N1 UE 334 supports NG RAN with or without dual connectivity with E-UTRAN.

Note that in this network architecture, 5GC 312 can connect both NG RAN 323 and E-UTRAN 322, and E-UTRAN 322 can connect both EPC 311 and 5GC 312. In one example, when a UE that supports camping on 5G system with 5GC NAS, it can perform initial access either through E-UTRAN that connects to 5GC or through NG RAN towards 5GC. The UE can also perform initial access through E-UTRAN towards EPC if supported and needed. Further, the UE can perform EPC NAS or 5GC NAS procedures over E-UTRAN or NG RAN respectively for mobility management and session management depending on capability indicated in AS layer if the UE also supports EPC NAS. Under this network architecture, the UE can preferably stay in 5GS and can select IMS domain for originating call, regardless of whether voice actually supported over the RAT the UE is camped on. This is because that the UE can be indicated with "IMS voice over PS supported" via IMS registration procedure. This indication indicates that the network is able to provide a successful IMS voice over PS session over NG RAN connected to 5GC, or the NG RAN can trigger to handover the UE to E-UTRAN connected to 5GC or handover to EPS when the network is not able to provide a successful IMS over PS session over NG RAN connected to 5GC.

Figure 4:
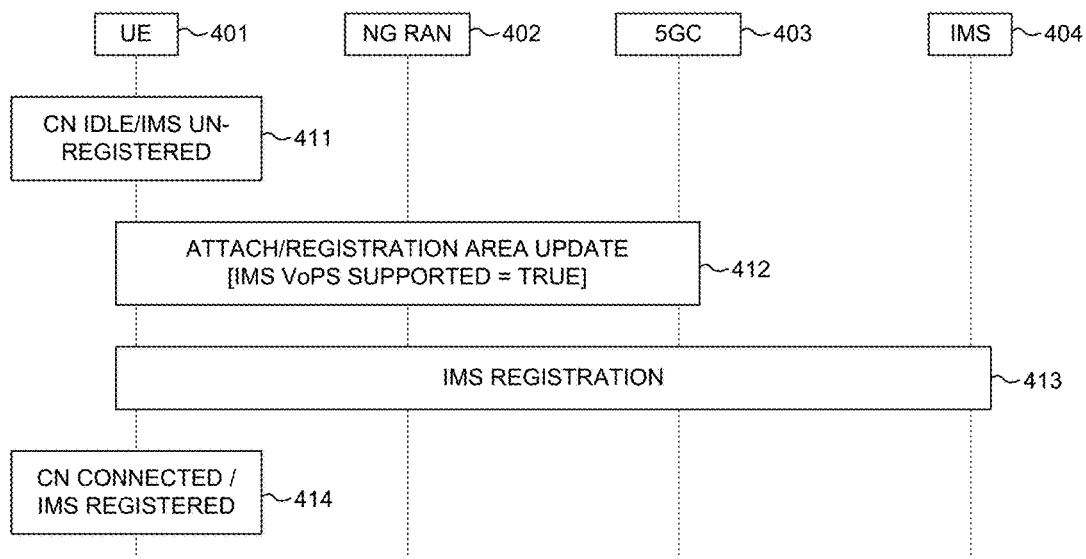
FIG. 4 illustrates an example of IMS registration process in 5GS in accordance with embodiments of the current invention.

FIG. 4 illustrates an example of IMS registration process in 5GS in accordance with embodiments of the current invention. Two indications are introduced to facilitate the multimedia call setup. A first indication is "IMS VoPS Supported" indication, it indicates whether IMS voice over PS session is supported over the NG core, e.g., 5GC. If supported, the UE registers to IMS to ensure reachability for multimedia calls. A second indication is "RAT VoPS Supported" indication, it indicates whether IMS voice over PS session is supported in the serving NG RAT or NG serving cell. This indication is considered valid by the UE if "IMS VoPS Supported" is TRUE. "RAT VoPS Supported" indication is broadcasted by NG RAN as part of the System Information of the cell. Alternatively, this indication can be maintained at registration area level, and be transmitted by signaling from the 5GC via Attach or Registration Area Update procedure.

The UE IMS registration status follows the "IMS VoPS Supported" indication. In the example of FIG. 4, in step 411, UE 401 is in CN idle mode, and is IMS un-registered initially. In step 412, UE 401 attaches to the network or performs non-periodic registration area update, and receives a message with "IMS VoPS Supported=TRUE" indication from 5GC 403. Upon receipt of the indication that IMS VoPS is supported, the UE triggers the IMS registration procedure if it is IMS unregistered. In step 413, UE 401 performs IMS registration with IMS server 404 accordingly. In step 414, UE 401 is in CN connected mode and is IMS registered. The 5GC 403 indicates IMS voice over PS session supported in one of the following cases: 1) the network is able to provide a successful IMS voice over PS session over NG RAN 402 connected to 5GC 403 with a 5G QoS flow that supports voice service with a predefined QoS requirement. 2) the network is not able to provide a successful IMS voice over PS session over NG RAN 402 connected to 5GC 403, but is able for one of the following: 2a) if an E-UTRAN connected to 5GC supports voice, and the NG RAN 402 is able to trigger handover to the E-UTRAN connected to 5GC 403 at QoS flow establishment for voice with QoS; or 2b) if the UE supports handover to an EPS, the EPS supports voice, and the NG RAN 402 is able to trigger handover to EPS at QoS flow establishment for voice with QoS. Therefore, in summary, the "IMS VoPS Supported" indication indicates whether IMS voice over PS session is supported over 5GS, which includes (5GC+NG RAN) and/or (5GC+E-UTRAN).

Figure 5:
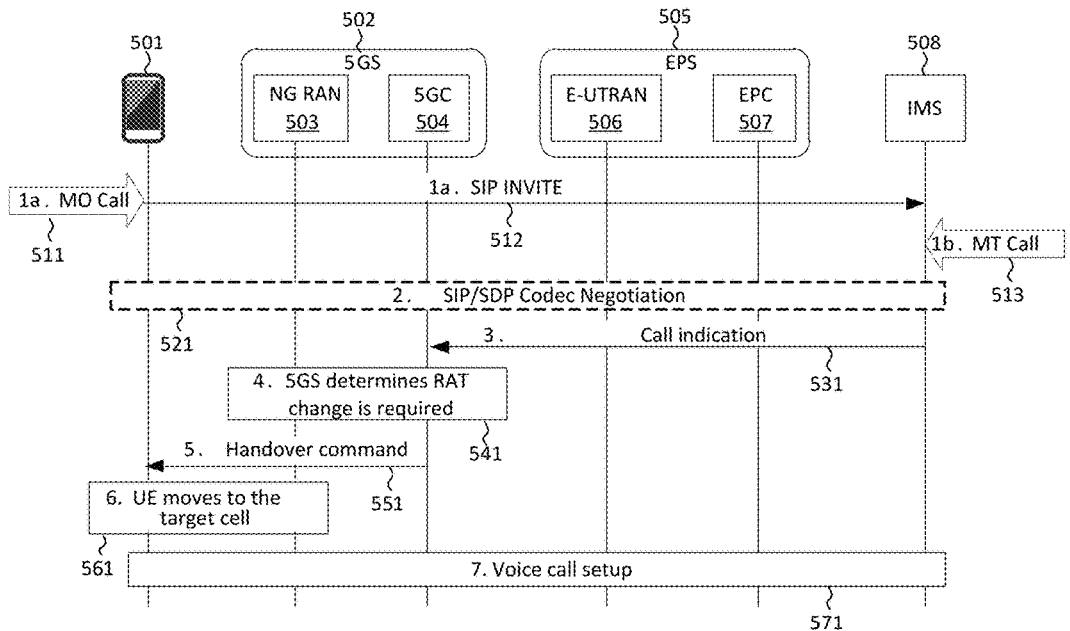
FIG. 5 illustrates a first embodiment of a network-based solution for supporting IMS call setup in a next generation system in accordance with embodiments of the current invention.

FIG. 5 illustrates a first embodiment of a network-based solution for supporting IMS call setup in a next generation system in accordance with embodiments of the current invention. The next generation system comprises a UE 501, 5GS 502 including NG RAN 503 and 5GC 504, EPS 505 including E-UTRAN 506 and EPC 507, and IMS server 508. In this embodiment, UE 501 is initially in CN connected mode, and is already IMS registered. UE 501 has received an IMS VoPS Support indication from 5GC 504 indicating voice over PS Session is supported in 5GC 504. For Mobile Originated (MO) call, UE 501 triggers the MO call in step 511 and sends out SIP invite to IMS server 508 in step 512. For Mobile Terminated (MT) call, IMS server 508 triggers the MT call in step 513. In step 521, optionally, SIP/SDP codec negotiation occurs between UE 501 and IMS server 508. In step 531, IMS server 508 sends a call indication to 5GC 504 for checking if UE 501 is currently in a voice-capable RAT/cell. The call indication includes information such as IP, port, and media type. In step 541, the 5GS determines that the UE's current RAT or serving cell is not voice-capable. The determination in step 541 can be made by the core network 5GC 504 or the access network NG RAN 503. The 5GC/NG RAN is aware of the value of the RAT VoPS Supported indication associated with UE and RAN based on UE/RAN radio capability. In one example, RAN can directly decide whether IMS VoPS is supported (i.e., improper frequency band). In another example, RAN can decide whether IMS VoPS is supported for the UE. When the indication "RAT VoPS Supported=FALSE" triggers a RAT change procedure.

In order to trigger the RAT change procedure, the 5GS further determines that there is another RAN, e.g. E-UTRAN 506 that is also connected to 5GC 504 for QoS flow establishment for voice, so that E-UTRAN 506 can be selected as the target cell for handover. In one example, the target cell is an LTE cell that supports voice calls. In another example, the target cell is an NG cell operating in a proper frequency band (e.g., a low frequency band) that also supports establishing a quality of service (QoS) flow for IMS voice calls. In step 551, 5GC 504 sends out a handover command, which is forwarded to UE 501 by NG RAN 503. In step 561, UE 501 moves to the target cell, e.g., E-UTRAN 506 that is connected to 5GC 504. In step 571, UE 501 performs voice call setup procedure through IMS server 508. Note that the SIP/SDP Codec Negotiation occurred in step 521 can be merged into the voice call setup procedure of step 571.

Figure 6:
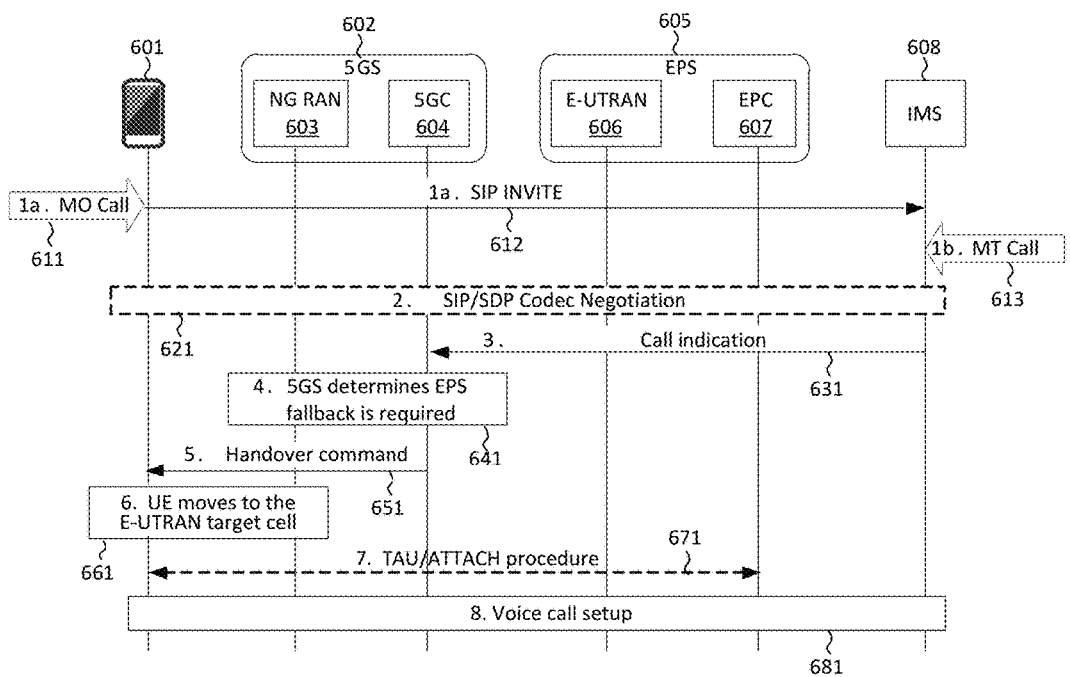
FIG. 6 illustrates a second embodiment of a network-based solution for supporting IMS call setup in a next generation system in accordance with embodiments of the current invention.

FIG. 6 illustrates a second embodiment of a network-based solution for supporting IMS call setup in a next generation system in accordance with embodiments of the current invention. The next generation system comprises a UE 601, 5GS 602 including NG RAN 603 and 5GC 604, EPS 605 including E-UTRAN 606 and EPC 607, and IMS server 608. In this embodiment, UE 601 is initially in CN connected mode, and is already IMS registered. UE 601 has received an IMS VoPS Support indication from 5GC 604 indicating Voice over PS Session is supported in 5GC 604. For Mobile Originated (MO) call, UE 601 triggers the MO call in step 611 and sends out SIP invite to IMS server 608 in step 612. For Mobile Terminated (MT) call, IMS server 608 triggers the MT call in step 613. In step 621, optionally, SIP/SDP codec negotiation occurs between UE 601 and IMS server 608. In step 631, IMS server 608 sends a call indication to 5GC 604 for checking if UE 601 is currently in a voice-capable RAT/cell. The call indication includes information such as IP, port, and media type. In step 641, the 5GS determines that the UE's current RAT or serving cell is not voice-capable. The determination in step 641 can be made by the core network 5GC 604 or the access network NG RAN 603. The 5GC/NG RAN is aware of the value of the RAT VoPS Supported indication. That is, the indication "RAT VoPS Supported=FALSE" triggers an EPS fallback procedure.

In order to trigger the EPS fallback procedure, the 5GS further determines that EPS fallback is required because there is no other voice-capable RAN can be selected as a target cell that is also connected to 5GC 604. As a result, UE 601 needs to be handover to EPS that supports voice. In step 651, 5GC 604 sends out a handover command, which is forwarded to UE 501 by NG RAN 603. In step 661, UE 601 moves to the target cell, e.g., E-UTRAN 606 that is connected to EPC 607. In step 671, UE 601 performs tracking area update (TAU) procedure or Attach procedure with EPC 607. Those procedures are required for interworking between 5GS and EPS. UE selects one of those two procedures based on whether the UE operates in Single Registration Mode (SRM) or Dual Registration Mode (DRM), and whether the core networks support N26 interface between EPS and 5GS. In step 681, UE 601 performs IMS voice call setup procedure through IMS server 608 in E-UTRAN 606 over EPC 607. Note that the SIP/SDP Codec Negotiation occurred in step 621 can be merged into the voice call setup procedure of step 681.

Figure 7:
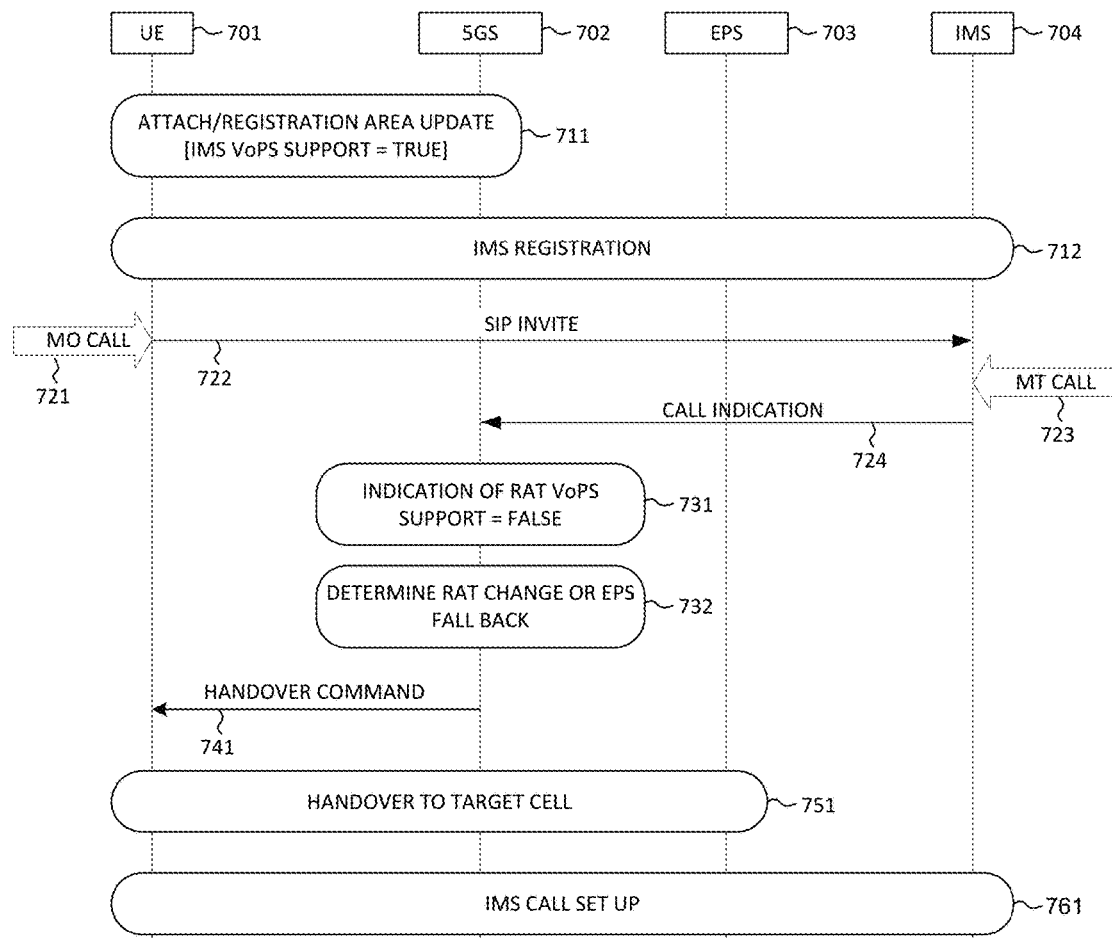
FIG. 7 illustrates a sequence flow of supporting an IMS voice call setup in accordance with a novel aspect of the current invention.

FIG. 7 illustrates a sequence flow of supporting an IMS voice call setup in accordance with a novel aspect of the current invention. In step 711, UE 701 performs an attach or a registration area update procedure to 5GS 702, which comprises an NG RAN and a 5G core network. 5GS 702 sends an "IMS VoPS Supported=TRUE" indication to UE 701. In step 712, UE 701 triggers an IMS registration procedure with IMS server 704 and becomes IMS registered. In step 721, UE 701 initiates an MO call and sends an SIP invite to IMS server 704. Alternatively, IMS server 704 initiates an MT call in step 723. In step 724, IMS server 704 sends an IMS call indication to 5GS 702. Upon receive the call indication, in step 731, 5GS determines whether the current serving cell supports VoPS by an indication, RAT VoPS Supported. If the indication RAT VoPS Supported=FALSE for the NG RAN for UE 701, then in step 732, 5GS 702 determines whether to trigger a RAT change or an EPS fallback procedure. In step 741, 5GS 702 sends a handover command to UE 701. In step 751, UE 701 handover from the current NG serving cell to a target cell that supports IMS VoPS. The target cell is connected to the 5GC for RAT change. Alternatively, the target cell is connected to an EPC for EPS fallback. In step 761, UE 701 performs IMS call setup through the IMS server 704 and completes the call setup procedure.

Figure 8:
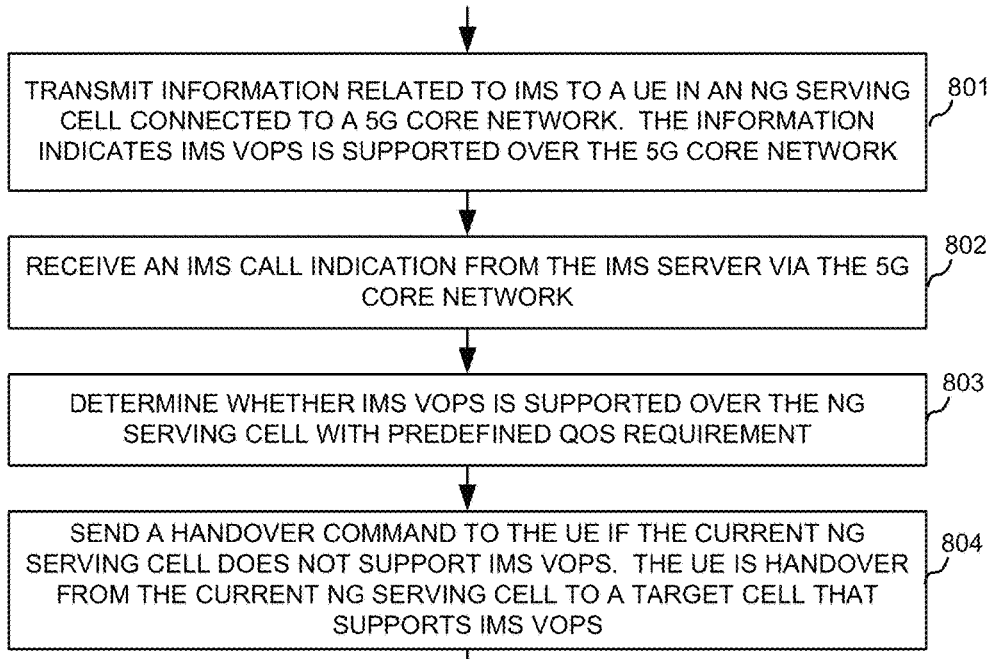
FIG. 8 is a flow chart of a method of performing IMS call setup from a base station perspective in accordance with a novel aspect.

FIG. 8 is a flow chart of a method of performing IMS call setup from a base station perspective in accordance with a novel aspect. In step 801, a base station transmits information related to IP Multimedia Subsystem (IMS) to a user equipment (UE) in a Next Generation (NG) serving cell connected to a 5G core network. The information indicates IMS voice over PS session is supported over the 5G core network. In step 802, the base station receives an IMS call indication from an IMS server via the 5GC. In step 803, the base station determines whether IMS voice over PS session is supported over the NG serving cell with a predefined QoS requirement. In step 804, the base station sends a handover command to the UE if the current NG serving cell does not support IMS VoPS. The UE is handover from the current NG serving cell to a target cell that supports IMS VoPS. In one embodiment, the handover command is triggered by a RAT change, wherein the target cell is connected to the 5G core network. In another embodiment, the handover command is triggered by an evolved packet system (EPS) fallback procedure, and the target cell is not connected to the 5G core network.

Figure 9:
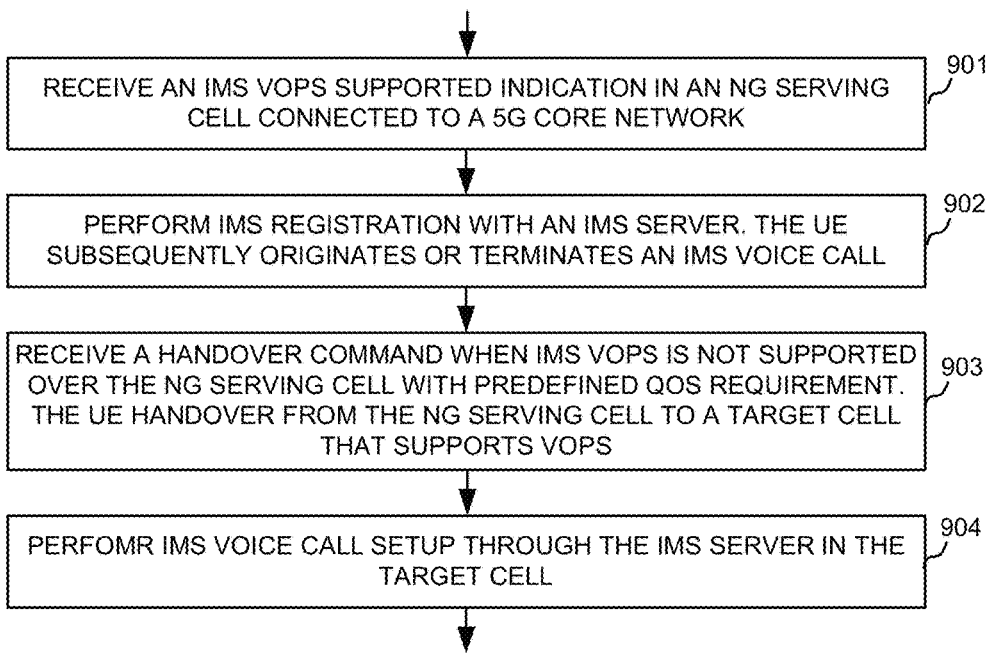
FIG. 9 is a flow chart of a method of performing IMS call setup from a user equipment perspective in accordance with a novel aspect.

FIG. 9 is a flow chart of a method of performing IMS call setup from a user equipment perspective in accordance with a novel aspect. In step 901, the UE receives an IP multimedia subsystem (IMS) voice over PS session is supported indication in a next generation (NG) serving cell connected to a 5G core network. In step 902, the UE performs IMS registration with an IMS server, and subsequently the UE is originating or terminating an IMS voice call. In step 903, the UE receives a handover command when IMS voice over PS session is not supported over the NG service cell with a predefined Quality of Service (QoS) requirement, and the UE handover from the NG serving cell to a target cell that supports IMS VoPS. In step 904, the UE performs IMS voice call setup through the IMS server in the target cell.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   transmitting information related to IP Multimedia Subsystem (IMS) from a serving base station to a user equipment (UE) in a Next Generation (NG) serving cell connected to a 5G core network, wherein the information indicates IMS voice over Packet Switched (PS) session is supported over the 5G core network;

receiving an IMS call indication from an IMS server via the 5G core network;

determining whether IMS voice over PS (VoPS) session is supported over the NG serving cell with a predefined Quality of Service (QoS) requirement; and generating a handover command to the UE upon determining that the current NG serving cell does not support IMS VoPS, wherein the base station triggers a handover for the UE from the current NG serving cell to a target cell that supports IMS VoPS for performing an IMS VoPS call setup.

2. The method of claim 1, wherein the target cell is another NG cell that supports IMS VoPS.

3. The method of claim 1, wherein the target cell is a 4G LTE cell that supports IMS VoPS.

4. The method of claim 1, wherein a first indication indicates whether IMS voice over PS session is supported over a 5G system.

5. The method of claim 1, wherein a second indication indicates whether IMS voice over PS session is supported over the NG serving cell.

6. The method of claim 1, wherein the handover command is triggered by a Radio Access Technology (RAT) change, and wherein the target cell is connected to the 5G core network.

7. The method of claim 1, wherein the handover command is triggered by an evolved packet system (EPS) fallback procedure, and wherein the target cell is not connected to the 5G core network.

8. A base station, comprising:

a radio frequency (RF) transmitter that transmits information related to IP Multimedia Subsystem (IMS) from a base station to a user equipment (UE) in a Next Generation (NG) serving cell connected to a 5G core network, wherein the information indicates IMS voice over Packet Switched (PS) session is supported over the 5G core network;

an RF receiver that receives an IMS call indication from an IMS server via the 5G core network;

a Quality of Service (QoS) circuit that determines whether IMS voice over PS (VoPS) session is supported over the NG serving cell with a predefined QoS requirement; and a handover circuit that generates a handover command to the UE upon determining that the current NG serving cell does not support IMS VoPS, wherein the base station triggers a handover for the UE from the current NG serving cell to a target cell that supports IMS VoPS for performing an IMS VoPS call setup.

9. The base station of claim 8, wherein the target cell is another NG cell that supports IMS VoPS.

10. The base station of claim 8, wherein the target cell is a 4G LTE cell that supports IMS VoPS.

11. The base station of claim 8, wherein a first indication indicates whether IMS voice over PS session is supported over a 5G system.

12. The base station of claim 8, wherein a second indication indicates whether IMS voice over PS session is supported over the NG serving cell.

13. The base station of claim 8, wherein the handover command is triggered by a Radio Access Technology (RAT) change, and wherein the target cell is connected to the 5G core network.

14. The base station of claim 8, wherein the handover command is triggered by an evolved packet system (EPS) fallback procedure, and wherein the target cell is not connected to the 5G core network.

15. A method, comprising:

receiving an IP multimedia subsystem (IMS) voice over Packet Switched (PS) session is supported indication by a user equipment (UE) in a next generation (NG) serving cell connected to a 5G core network;

performing IMS registration with an IMS server, wherein subsequently the UE is originating or terminating an IMS voice call;

receiving a handover command when IMS voice over PS (VoPS) session is not supported over the NG service cell with a predefined Quality of Service (QoS) requirement, wherein the UE handover from the NG serving cell to a target cell that supports IMS VoPS; and generating an IMS voice call setup through the IMS server in the target cell.

16. The method of claim 15, wherein the handover command is triggered by a Radio Access Technology (RAT) change, and wherein the target cell is connected to the 5G core network.

17. The method of claim 16, wherein the target cell is either another NG cell or a 4G LTE cell that supports IMS VoPS.

18. The method of claim 15, wherein the handover command is triggered by an evolved packet system (EPS) fallback procedure, and wherein the target cell is not connected to the 5G core network.

19. The method of claim 18, wherein the UE performs a tracking area update (TAU) procedure or an Attach procedure with an evolved packet core network (EPC) after handover.

20. The method of claim 15, wherein the UE performs codec negotiation with the IMS server before or after the handover.

* * * * *